(12) United States Patent
Richardson et al.

(10) Patent No.: US 10,330,334 B2
(45) Date of Patent: Jun. 25, 2019

(54) PRESSURE EQUALIZATION VENT FOR USE IN AN AIRCRAFT ASSEMBLY

(71) Applicant: The Boeing Company, Seal Beach, CA (US)

(72) Inventors: Marcus K. Richardson, Bothell, WA (US); Clyde Robert Tuohimaa, Lynnwood, WA (US); Michael James Tonks, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 608 days.

(21) Appl. No.: 14/166,135

(22) Filed: Jan. 28, 2014

(65) Prior Publication Data

US 2015/0211755 A1    Jul. 30, 2015

(51) Int. Cl.
*F24F 7/00* (2006.01)
*B64D 13/04* (2006.01)
*B23P 15/00* (2006.01)

(52) U.S. Cl.
CPC .............. *F24F 7/00* (2013.01); *B23P 15/001* (2013.01); *B64D 13/04* (2013.01); *F24F 2007/001* (2013.01); *Y10T 29/49412* (2015.01)

(58) Field of Classification Search
CPC .................................. B64D 13/02; F24F 7/00
USPC .................................................... 454/76, 255
See application file for complete search history.

(56) References Cited

U.S. PATENT DOCUMENTS

| | | | |
|---|---|---|---|
| 3,204,548 A | 9/1965 | McCabe | |
| 3,584,567 A | 6/1971 | Roach | |
| 5,137,231 A * | 8/1992 | Boss | B64C 1/18 244/118.5 |
| 5,259,576 A * | 11/1993 | Howard | B64C 1/1438 244/129.4 |
| 5,704,207 A | 1/1998 | Jensen et al. | |
| 6,129,312 A | 10/2000 | Weber | |
| 8,439,308 B2 | 5/2013 | Armstrong et al. | |
| 8,651,924 B1 * | 2/2014 | Jones | B64D 13/02 244/118.5 |

(Continued)

FOREIGN PATENT DOCUMENTS

| | | |
|---|---|---|
| CN | 102102588 A | 6/2011 |
| GB | 2443841 A | 5/2008 |
| JP | H07215297 A | 8/1995 |

(Continued)

OTHER PUBLICATIONS

Extended European Search Report for Application No. 15152892.4, dated Jun. 3, 2015, 6 pages.

(Continued)

*Primary Examiner* — Steven B McAllister
*Assistant Examiner* — Samantha Probst
(74) *Attorney, Agent, or Firm* — Armstrong Teasdale LLP

(57) ABSTRACT

A pressure equalization vent for use in an aircraft assembly is provided. The pressure equalization vent includes an opening having a first end and a second end opposite the first end, and a first side and a second side opposite the first side. The vent further includes a plurality of louvers positioned within the opening. Each louver is positioned a predetermined distance from an adjacent louver to form a gap therebetween. Each louver includes an airfoil-shaped cross-section configured to increase airflow efficiency across the vent.

19 Claims, 3 Drawing Sheets

(56) References Cited

U.S. PATENT DOCUMENTS

| | | | |
|---|---|---|---|
| 8,734,211 B2* | 5/2014 | Tuchimaa | B64C 1/1446 |
| | | | 137/511 |
| 2009/0081937 A1 | 3/2009 | Tuohimaa et al. | |

FOREIGN PATENT DOCUMENTS

| | | | |
|---|---|---|---|
| JP | 2011529010 A | 12/2011 | |
| WO | 2011125030 A1 | 10/2011 | |

OTHER PUBLICATIONS

Office Action for Canadian Patent Application No. 2870712, dated Sep. 1, 2016, 5 pages.
Notice of Reasons for Rejection for Japanese Patent Application No. 2015-009487, dated Dec. 5, 2017, 2 pages.
Notice of First Office Action and Search Report for Chinese Application No. 201510007256X, dated Feb. 23, 2017, 10 pages.
Office Action for Canadian Application No. 2,870,712, dated Jun. 21, 2017, 5 pages.

* cited by examiner

PRESSURE EQUALIZATION VENT FOR USE IN AN AIRCRAFT ASSEMBLY

BACKGROUND

The field of the present disclosure relates generally to aircraft assemblies and, more specifically, to pressure equalization vents for use in aircraft assemblies.

At least some known aircraft include a wing-to-body fairing to increase aerodynamic efficiency. During acceleration/deceleration of an aircraft and/or as the aircraft gains/loses altitude, unpressurized aircraft volumes (i.e., not the cabin) experience significant pressure changes. For example, the unpressurized volumes are subject to pressure changes. In at least some known aircraft, such pressure changes are equalized using simple vents located in the fairing. Known vents typically appear similar to household vents. However, the known vents may create substantial drag on the aircraft by their mere presence.

BRIEF DESCRIPTION

In one aspect, a pressure equalization vent for use in an aircraft assembly is provided. The pressure equalization vent includes an opening having a first end and a second end opposite the first end, and a first side and a second side opposite the first side. The vent further includes a plurality of louvers positioned within the opening. Each louver is positioned a predetermined distance from an adjacent louver to form a gap therebetween. Each louver includes an airfoil-shaped cross-section configured to increase airflow efficiency across the vent.

In another aspect, a method of manufacturing a pressure equalization vent for an aircraft assembly is provided. The method includes forming an opening having a first end and a second end opposite the first end, and a first side and a second side opposite the first side. The method further includes positioning a plurality of louvers within the opening. Each louver is positioned a predetermined distance from an adjacent louver to form a gap therebetween. Each louver includes an airfoil-shaped cross-section configured to increase airflow efficiency across the vent.

DETAILED DESCRIPTION

Figure 1:
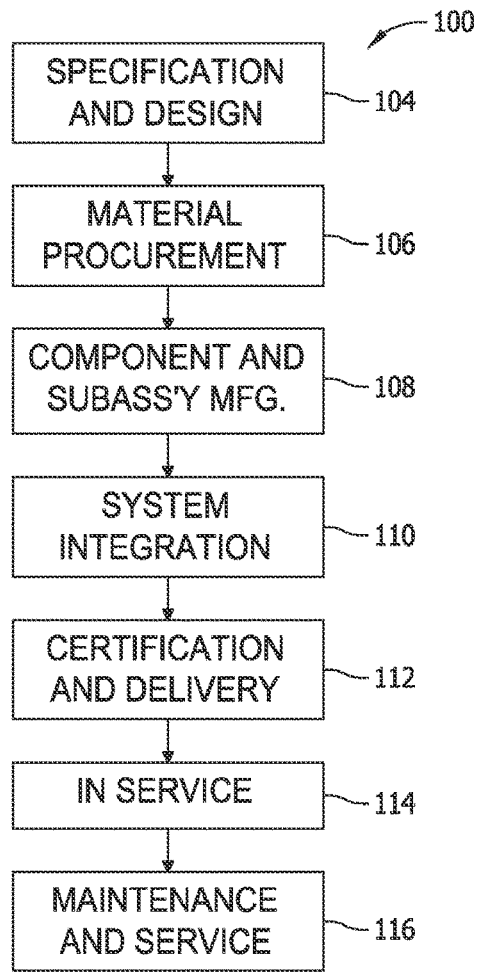
FIG. 1 is a flow diagram of an exemplary aircraft production and service methodology.
Figure 2:
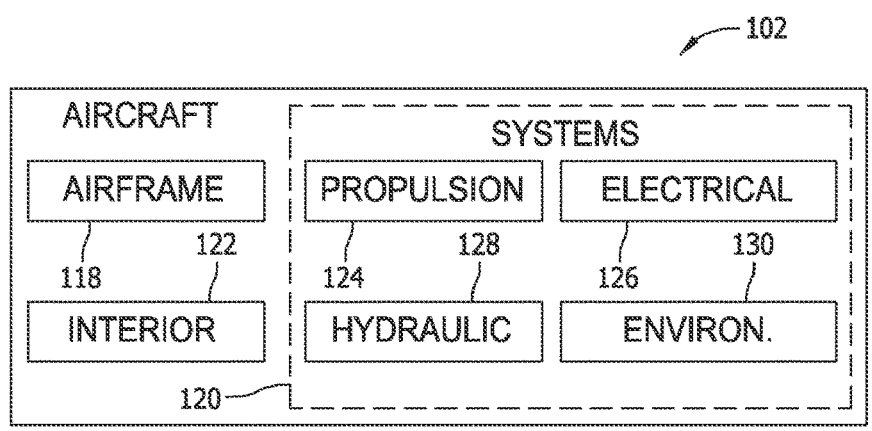
FIG. 2 is a block diagram of an exemplary aircraft.

The methods and systems described herein are in the context of aircraft manufacturing and service method 100 (shown in FIG. 1) and an aircraft 102 (shown in FIG. 2). Alternatively, the methods and systems described herein may be implemented in any context and/or in any environment involving a fluid distribution system. During pre-production, method 100 may utilize specification and design 104 of aircraft 102 and/or material procurement 106. During production, component and subassembly manufacturing 108 and system integration 110 of aircraft 102 occurs. Thereafter, aircraft 102 may go through certification and delivery 112 prior to being placed in service 114. While in service by a customer, aircraft 102 is scheduled for routine maintenance and service 116 (including, for example, modification, reconfiguration, and/or refurbishment).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced using method 100 may include an airframe 118 having a plurality of systems 120 and an interior 122. Examples of high-level systems 120 may include one or more of a propulsion system 124, an electrical system 126, a hydraulic system 128, and/or an environmental system 130. Any number of other systems may be included. Although an aerospace example is shown, the principles of the invention may be applied to other industries, such as the automotive industry, machinery, heavy equipment, and heating, ventilation, and air conditioning (HVAC) applications.

Apparatus and methods embodied herein may be employed during any one or more of the stages of the production and service method 100. For example, components or subassemblies corresponding to production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of or reducing the cost of aircraft 102. Similarly, one or more of apparatus implementations, method implementations, or a combination thereof may be utilized while aircraft 102 is in service, for example and without limitation, to maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
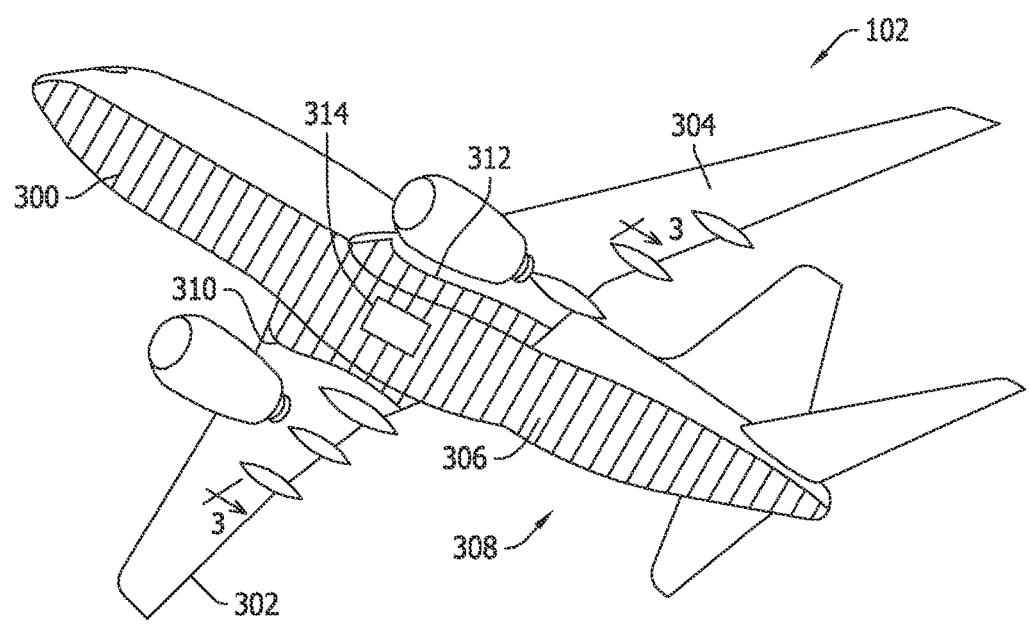
FIG. 3 is a bottom perspective view of an exemplary wing-to-body fairing that may be used with the aircraft shown in FIG. 2.

FIG. 3 is a bottom perspective view of an exemplary wing-to-body fairing 300 that may be used with aircraft 102 (shown in FIG. 2). In the exemplary implementation, aircraft 102 includes a first wing 302 and a second wing 304, both coupled to a fuselage 306. Wing-to-body fairing 300 extends across a bottom surface 308 of fuselage 306 from a first portion 310 of first wing 302 to a first portion 312 of second wing 304. In the exemplary implementation, wing-to-body fairing 300 also includes a pressure equalization vent 314 for equalizing pressure changes between unpressurized areas of aircraft 102 and outside air. The pressure equalization vent described herein is not limited to being used with a wing-to-body fairing. Rather, the pressure equalization vent may be used with any type of fairing that enables the pressure equalization vent to function as described herein.

Figure 4:
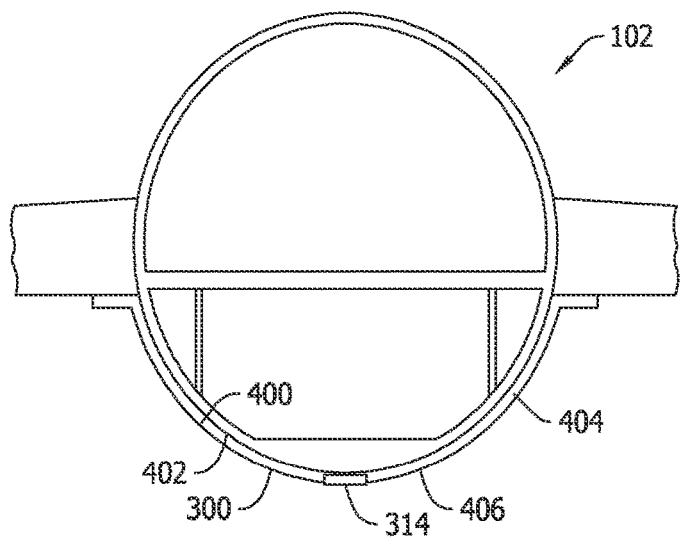
FIG. 4 is a partial cross-sectional view of the aircraft shown in FIG. 3 taken through line 3-3.

FIG. 4 is a partial cross-sectional view of aircraft 102 (shown in FIG. 3) taken through line 3-3. In the exemplary implementation, wing-to-body fairing 300 includes an interior surface 400 adjacent an exterior surface 402 of fuselage 306. Fairing interior surface 400 and fuselage exterior surface 402 define a cavity 404 therebetween that has a first, interior pressure. An exterior area 406 outside of wing-to-body fairing 300 has a second, exterior pressure. In one embodiment exterior area 406 may comprise atmospheric air outside of aircraft 102 during flight. The exterior pressure of exterior area 406 may be greater or less than the interior pressure within cavity 404. Pressure equalization vent 314 is configured to equalize the interior pressure with the exterior pressure.

Figure 5:
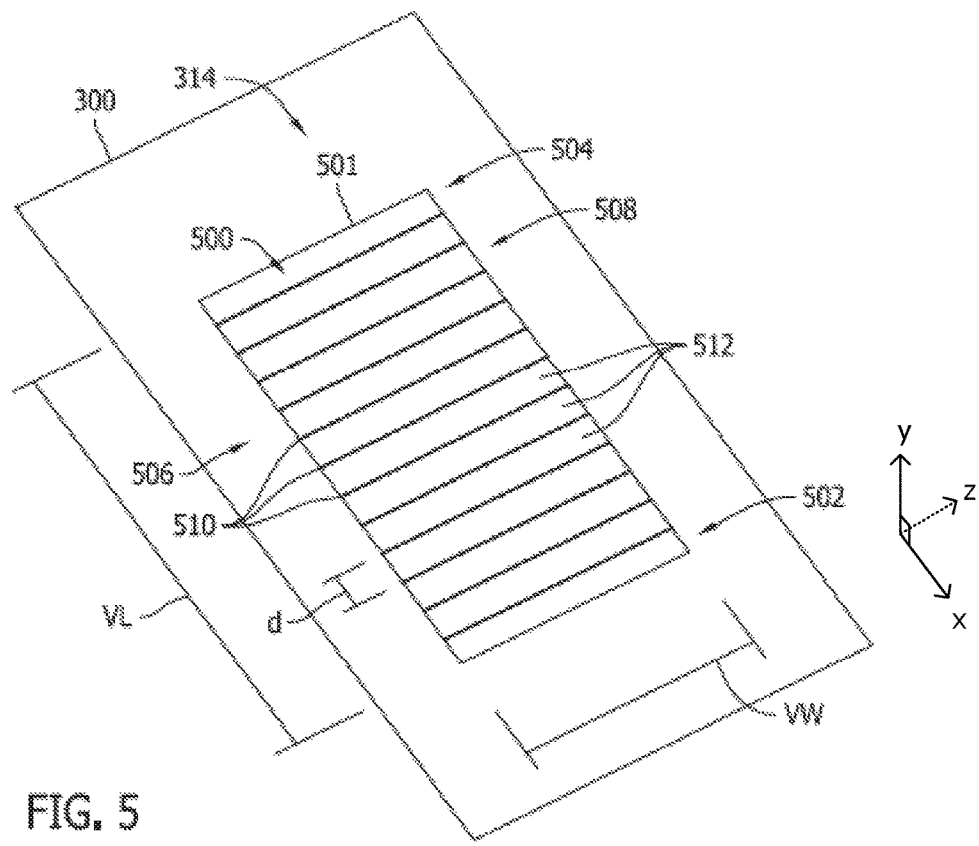
FIG. 5 is a perspective view of a pressure management system that may be used with the wing-to-body fairing shown in FIGS. 3 and 4.

FIG. 5 is a perspective view of a pressure equalization vent 314 that may be used with wing-to-body fairing 300 (shown in FIGS. 3 and 4). In the exemplary implementation, vent 314 is configured to equalize a pressure differential between the exterior pressure and the interior pressure within cavity 404 during maneuvers of aircraft 102 and during other flight conditions. Vent 314 creates less drag on aircraft 102 compared to known designs.

In the exemplary implementation, vent 314 is substantially rectangular in shape and defines an opening 500. Opening 500 is defined in a body 501 of vent 314, which is configured to be installed in an opening (not shown) defined in the skin of aircraft 102. Alternatively, opening 500 may be defined directly in wing-to-body fairing 300. Vent opening 500 has a first end 502 and a second end 504 opposite first end 502. Vent opening 500 also has a first side 506 and a second side 508 opposite first side 506. Vent opening 500 has a predetermined vent length VL between first end 502 and second end 504, and a predetermined vent width VW between first side 506 and second side 508. Vent 314 also includes a plurality of louvers 510 coupled to body 501 or directly to the aircraft skin. Louvers 510 are oriented substantially perpendicularly to vent length VL. Each louver 510 spans across vent opening 500 and has width VW from first side 506 to second side 508. Further, louvers 510 are spaced a predetermined distance d from one another to form gaps 512 between adjacent louvers 510.

Figure 6:
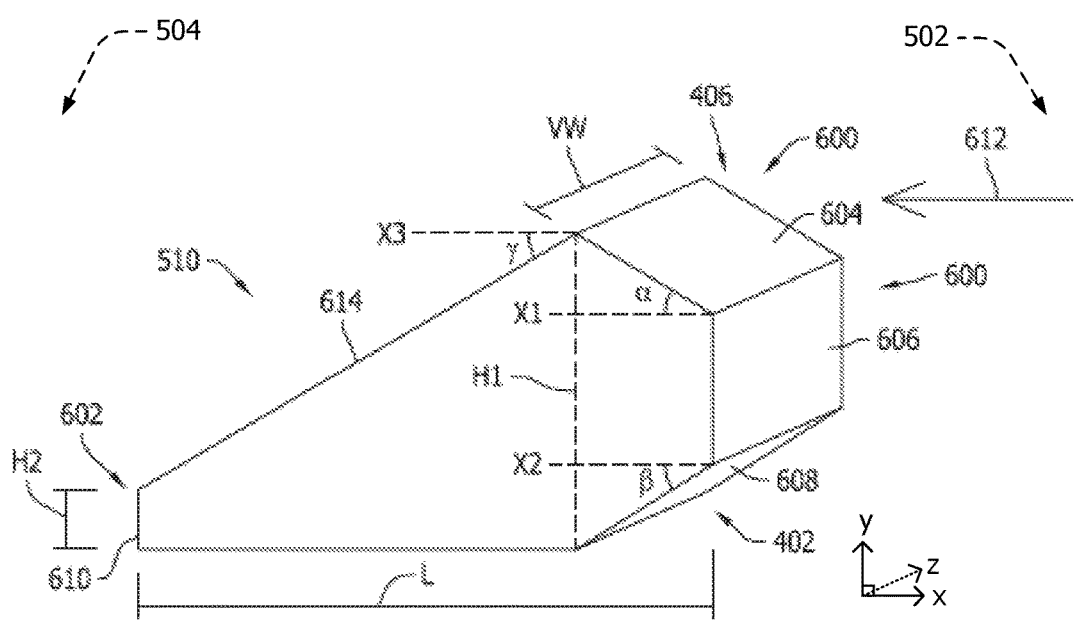
FIG. 6 is a side perspective view of an exemplary louver that may be used with the pressure equalization vent shown in FIGS. 3-5.

FIG. 6 is a side perspective view of an exemplary louver 510 that may be used with pressure equalization vent 314 (shown in FIGS. 3-5). In the exemplary implementation, louver 510 has a length L and width VW. Louver 510 has an airfoil-shaped cross-section, including a leading surface 600 and a trailing surface 602. Leading surface 600 has a height H1 and is trapezoidal in shape, and includes a plurality of planar surfaces. More specifically, leading surface 600 includes at least a first planar surface 604, a second planar surface 606, and a third planar surface 608. First planar surface 604 is oriented such that it has a positive angle α relative to a reference axis X1 on an x-y coordinate plane. More specifically, first planar surface 604 is angled away from fuselage exterior surface 402 (shown in FIG. 4) towards exterior area 406 (shown in FIG. 4) from leading surface 600 to trailing surface 602. Further, first planar surface 604 extends obliquely to the direction from first end 502 (shown in FIG. 5) to second end 504 (shown in FIG. 5). More specifically, first planar surface 604 extends at an oblique angle 605 that corresponds to angle α. Angle α enables first planar surface 604 to deflect air 612 flowing across vent 314 away from aircraft 102 to reduce an amount of air that is forced into aircraft 102. Reducing the air forced into aircraft 102 reduces drag and increases an overall efficiency of aircraft 102. Second planar surface 606 is oriented in a vertical direction, substantially perpendicular to axis XI on the x-y coordinate plane. Third planar surface 608 is oriented such that it has a negative angle β relative to a reference axis X2 on the x-y coordinate plane. More specifically, third planar surface 608 is angled away from exterior area 406 towards fuselage exterior surface 402 from leading surface 600 to trailing surface 602. Angle β enables adjacent louvers 510 to be positioned within vent 314, while allowing sufficient space for air to enter and/or exit vent 314 during pressure equalization. Trailing surface 602 includes a vertical surface 610 and has a height H2. Vertical surface 610 is substantially perpendicular to axes X1 and X2 on the x-y coordinate plane. Leading surface height H1 is greater than trailing surface height H2. Louver 510 further includes a surface 614 coupled between first planar surface 604 and vertical surface 610. Surface is oriented such that it has a negative angle γ relative to a reference axis X3 on the x-y coordinate plane. More specifically, surface 614 is angled away from exterior area 406 towards fuselage exterior surface 402 from leading surface 600 to trailing surface 602. Angle γ is configured to deflect air 612 away from second planar surface 606 to reduce impingement on second planar surface 606. Angle γ is also configured to alter a direction of air 612 such that the direction is more tangential to a direction of flight of aircraft 102. Heights H1 and H2 are parallel to the y-axis, reference axes X1, X2, and X3 and length L are parallel to the x-axis, and width VW is parallel to the x-axis.

In the exemplary implementation, in addition to the shape of each louver 510, length L and width VW of louvers 510 in combination with distance d between each louver 510 further enables proper venting of wing-to-body fairing 300 while reducing aerodynamic drag. More specifically, in the exemplary implementation, vent opening 500 has a predetermined length VL to width VW ratio and a predetermined distance d between louvers 510 to a number of louvers 510 ratio. The values for the length VL to width VW ratio and the distance d between louvers 510 to a number of louvers 510 ratio are dependent on a typical flight speed of aircraft 102 in association with an amount of air to be removed from cavity 404.

Regarding the length VL to width VW ratio, louver 510 nearest first end 502 (shown in FIG. 5) is exposed to the largest amount of air flowing across vent 314 relative to the other louvers 510. Because first planar surface 604 of louver 510 nearest first end 502 deflects air away from aircraft 102, the amount of air contacting the remaining louvers 510 is substantially reduced. If the length VL to width VW ratio is too large, vent 314 would not be exposed to a sufficient amount of air to equalize the pressure. Alternatively, if the length VL to width VW ratio is too small, vent 314 would have a larger surface exposed to the air at first end 502, resulting in increased drag on aircraft 102.

Moreover, in the exemplary implementation, vent opening 500 has the predetermined distance d between louvers 510 to a number of louvers 510 ratio. If distance d between each louver 510 is too large, the deflection effect created by first planar surface 604 would not protect downstream louvers 510 from the flow of air. Accordingly, each louver 510 would be contacted by a larger amount of air, increasing drag on vent 314. Alternatively, if distance d between each louver 510 is too small, the amount of air deflected by first planar surface 604 would be reduced, resulting in the air being deflected towards a downstream louver 510, rather than away from aircraft 102. As distance d between louvers 510 increases, the number of louvers 510 would have to decrease to maintain the length VL to width VW ratio. Moreover, as distance d between louvers 510 decreases, the number of louvers 510 would have to increase to maintain the length VL to width VW ratio. Accordingly, the predetermined distance d between louvers 510 to a number of louvers 510 ratio is significant to facilitate proper pressure equalization, while reducing drag.

In the exemplary implementation, when aircraft 102 is airborne, air flows across vent 314 in a direction 612. Vent 314 enables external airflow to pass more freely over vent 314 without creating substantial drag on aircraft 102 compared to known designs. More specifically, the design of vent 314 creates less drag compared to existing designs and it also creates less drag during pressure equilibration between fairing inner surface 400 and exterior area 406 than the existing designs. Moreover, louvers 510 and gaps 512 oriented closer to first end 502 of vent 314 protect successive louvers 510 and gaps 512 toward second end 504, resulting in increased vent efficiency as air flows from first end 502 to second end 504.

A method is provided of manufacturing a pressure equalization vent for an aircraft assembly. In the exemplary implementation, the method includes forming an opening having a first end and a second end opposite the first end, and a first side and a second side opposite the first side. The method also includes positioning a plurality of louvers within the vent opening, each louver positioned a predetermined distance from an adjacent louver to form a gap therebetween, wherein each louver includes an airfoil-shaped cross-section configured to increase airflow efficiency across the vent.

In some implementations, the method further includes determining a ratio of vent length to vent width using a known flight speed and an amount of air to be removed from the vent for pressure equalization. A known flight speed means, for example an anticipated actual flight speed of the aircraft assembly.

In some implementations, the method further includes determining a ratio of the predetermined distance between adjacent louvers to a total number of louvers using a known flight speed and an amount of air to be removed from the vent for pressure equalization.

In some implementations, the method further includes forming a leading surface and a trailing surface in each louver. Forming a leading surface may further include angling a first planar surface upwardly relative to a horizontal axis, the first planar surface configured to deflect incoming airflow away from the vent.

The pressure equalization vent and method of manufacture described herein facilitates at least one of (a) forming an opening having a first end and a second end opposite the first end, and a first side and a second side opposite the first side; and (b) positioning a plurality of louvers within the opening, each louver positioned a predetermined distance from an adjacent louver to form a gap therebetween, wherein each louver includes an airfoil-shaped cross-section configured to increase airflow efficiency across the vent.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pressure equalization vent for use in an aircraft assembly, said pressure equalization vent comprising:
    an opening having a first end and a second end opposite said first end, and a first side and a second side opposite said first side, said first and second sides extending between said first and second ends; and
    a plurality of louvers positioned within the opening and spanning from said first side to said second side, each louver positioned a predetermined distance, along a direction from said first end to said second end, from an adjacent louver to form a gap therebetween, each said louver comprising an airfoil-shaped cross-section comprising a plurality of leading surfaces facing said first end and a trailing surface facing said second end, said plurality of leading surfaces including a first planar surface extending at an angle away from an exterior surface of the aircraft assembly, when the vent is installed on the exterior surface of the aircraft assembly, from said first end to said second end and positioned within the opening such that said first planar surface deflects, away from said vent, air flowing across said vent in the direction from said first end to said second end and from said plurality of leading surfaces to said trailing surface.

2. A pressure equalization vent in accordance with claim 1, wherein the opening has
    a predetermined vent length between said first and second ends, and
    a predetermined vent width between said first and second sides.

3. A pressure equalization vent in accordance with claim 2, wherein said vent opening comprises a predetermined vent length to vent width ratio determined by a known flight speed and an amount of air to be removed from said vent for pressure equalization.

4. A pressure equalization vent in accordance with claim 1, wherein said vent comprises a predetermined distance between adjacent louvers to a total number of louvers ratio determined by a known flight speed and an amount of air to be removed from said vent for pressure equalization.

5. A pressure equalization vent in accordance with claim 1, wherein said plurality of leading surfaces further comprises a second planar surface oriented substantially perpendicular to the direction across said vent from said first end to said second end.

6. A pressure equalization vent in accordance with claim 5, wherein said plurality of leading surfaces further comprises a third planar surface angled towards the exterior surface of the aircraft assembly from said plurality of leading surfaces to said trailing surface.

7. A pressure equalization vent in accordance with claim 1, wherein said trailing surface comprises a vertical surface that is substantially perpendicular to the direction across said vent from said first end to said second end.

8. A pressure equalization vent in accordance with claim 1, wherein said plurality of leading surfaces comprises a first height and said trailing surface comprises a second height, wherein the second height is smaller than the first height.

9. A pressure equalization vent in accordance with claim 1, wherein louvers and gaps oriented closer to said first end of said vent are configured to interact with more of the air flowing across said vent in the direction from said first end to said second end than successive louvers and gaps toward said second end.

10. A pressure equalization vent in accordance with claim 1, wherein said vent is further configured to equalize a pressure differential between an interior pressure of the aircraft assembly and an exterior pressure of the aircraft assembly.

11. A pressure equalization vent in accordance with claim 1, wherein said vent is further configured to reduce drag on the aircraft assembly.

12. A pressure equalization vent in accordance with claim 11, wherein a length and a width of said plurality of louvers are adjusted in combination with the distance between adjacent louvers to reduce drag.

13. A method of manufacturing a pressure equalization vent for an aircraft assembly, said method comprising:
    forming an opening having a first end and a second end opposite the first end, and a first side and a second side opposite the first side, the first and second sides extending between the first and second ends; and
    positioning a plurality of louvers within the vent opening and spanning from the first side to the second side, each louver positioned a predetermined distance, along a direction from the first end to the second end, from an adjacent louver to form a gap therebetween, wherein each louver includes an airfoil-shaped cross-section comprising a plurality of leading surfaces facing the first end and a trailing surface facing the second end, the plurality of leading surfaces including a first planar surface extending at an angle away from an exterior surface of the aircraft assembly, when the vent is installed on the exterior surface of the aircraft assembly, from the first end to the second end and positioned within the opening such that the first planar surface deflects, away from the vent, air flowing across the vent in the direction from the first end to the second end and from the plurality of leading surfaces to the trailing surface.

14. A method in accordance with claim 13, further comprising determining a ratio of vent length to vent width using a known flight speed and an amount of air to be removed from the vent for pressure equalization.

15. A method in accordance with claim 13, further comprising determining a ratio of the predetermined distance between adjacent louvers to a total number of louvers using a known flight speed and an amount of air to be removed from the vent for pressure equalization.

16. A pressure equalization vent for use in an aircraft assembly, said pressure equalization vent comprising:
    an opening having a first end and a second end opposite said first end, and a first side and a second side opposite said first side, said first and second sides extending between said first and second ends; and
    a plurality of louvers positioned within the opening and spanning from said first side to said second side, each louver positioned a predetermined distance, along a direction from said first end to said second end, from an adjacent louver to form a gap therebetween, each said louver comprising an airfoil-shaped cross-section comprising a plurality of leading surfaces facing said first end and a trailing surface facing said second end, said plurality of leading surfaces including:
    a first surface extending at an angle away from an exterior surface of the aircraft assembly, when the vent is installed on the exterior surface of the aircraft assembly, from said first end to said second end and positioned within the opening such that said first surface deflects, away from said vent, air flowing across said vent in the direction from said first end to said second end and from said plurality of leading surfaces to said trailing surface;
    a second surface oriented substantially perpendicular to the direction across said vent from said first end to said second end; and
    a third surface angled towards the exterior surface of the aircraft assembly from said plurality of leading surfaces to said trailing surface.

17. A pressure equalization vent in accordance with claim 16, wherein the first, second, and third surfaces form a trapezoidal shape.

18. A pressure equalization vent in accordance with claim 16, wherein the plurality of louvers have respective positions in the opening that are fixed relative to said vent.

19. A pressure equalization vent in accordance with claim 16, wherein louvers and gaps oriented closer to said first end of said vent are configured to protect successive louvers and gaps toward said second end to increase vent efficiency as air flows over said vent from said first end to said second end.

* * * * *